(12) United States Patent
Nguyen et al.

(10) Patent No.: US 8,449,230 B2
(45) Date of Patent: May 28, 2013

(54) CUTTING INSERT HAVING CONCAVE CLEARANCE DEPRESSIONS FORMED ON CORNER SIDE SURFACES

(75) Inventors: Eric William Nguyen, Rockford, IL (US); William Bennett Johnson, Machesney Park, IL (US)

(73) Assignee: Ingersoll Cutting Tool Company, Rockford, IL (US)

( * ) Notice: Subject to any disclaimer, the term of this patent is extended or adjusted under 35 U.S.C. 154(b) by 419 days.

(21) Appl. No.: 12/855,965

(22) Filed: Aug. 13, 2010

(65) Prior Publication Data
US 2012/0039678 A1   Feb. 16, 2012

(51) Int. Cl.
B23C 5/20   (2006.01)

(52) U.S. Cl.
CPC ................................... *B23C 5/20* (2013.01)
USPC ............... 409/132; 407/113; 407/61; 407/42

(58) Field of Classification Search
CPC ...................................... B23C 5/20; B23C 5/16
USPC ............ 407/113, 48, 61, 62, 34, 42; 409/132, 409/131
See application file for complete search history.

(56) References Cited

U.S. PATENT DOCUMENTS

| | | | |
|---|---|---|---|
| 4,966,500 A * | 10/1990 | Tsujimura et al. | 407/34 |
| 6,056,485 A * | 5/2000 | Magill et al. | 407/54 |
| 6,336,776 B1 * | 1/2002 | Noggle | 407/34 |
| 6,764,254 B2 * | 7/2004 | Emoto et al. | 407/34 |
| 7,104,736 B2 | 9/2006 | Satran et al. | |
| 7,220,083 B2 | 5/2007 | Festeau et al. | |
| 7,246,973 B2 | 7/2007 | Johnson et al. | |
| 2006/0045636 A1 * | 3/2006 | Johnson et al. | 407/42 |
| 2008/0273931 A1 * | 11/2008 | Spitzenberger | 407/51 |
| 2009/0015504 A1 | 1/2009 | Tsai et al. | |
| 2011/0129309 A1 * | 6/2011 | Kovac et al. | 407/42 |

FOREIGN PATENT DOCUMENTS

| | | | |
|---|---|---|---|
| JP | 08323510 | * | 12/1996 |
| JP | 11-333616 | * | 12/1999 |
| JP | 2004-284010 A | * | 10/2004 |
| JP | 2007-185769 A | * | 7/2007 |
| JP | 2008-62382 A | * | 3/2008 |
| WO | WO 2008/132757 | | 11/2008 |

OTHER PUBLICATIONS

The Basics of Milling, http://www.eng.cam.ac.uk/DesignOffice/cad/powermill/introduction.pdf.*
International Search Report dated Jan. 18, 2012 issued in PCT counterpart application No. PCT/US2011/046824.
Written Opinion of International Searching Authority dated Jan. 18, 2012 issued in PCT counterpart application No. PCT/US2011/046824.

* cited by examiner

*Primary Examiner* — Daniel Howell
*Assistant Examiner* — Ryan Rufo
(74) *Attorney, Agent, or Firm* — Womble Carlyle

(57) ABSTRACT

A tangential cutting insert includes two opposing end surfaces and a peripheral side surface extending between the two opposing end surfaces. The peripheral side surface includes two opposing major side surfaces connected to two opposing minor side surfaces via corner side surfaces. A peripheral edge is formed at the intersection of each end surface with the peripheral side surface. Each end surface has two raised corners with associated raised corner cutting edges and two lowered corners with associated lowered corner cutting edges. Each of the corner side surfaces includes a concave clearance depression which serves as a relief surface for an associated lowered corner cutting edge. The concave clearance depression extends from its associated lowered corner cutting edge in the direction of, but does not intersect, a raised corner associated with opposite end surface.

13 Claims, 15 Drawing Sheets

A peripheral edge (520*a*, 520*b*) is formed at the intersection of each end surface (502*a*, 502*b*) and the peripheral side surface 510. The cutting insert 500 also includes a through bore 590 that passes between the opposing major side surfaces 512*a*, 512*b*.

In a major side view of the cutting insert (see FIG. 3), each end surface 502*a*, 502*b* has four corners 530*a*, 530*b*, 530*c*, 530*d* including two diagonally opposed lowered corners 530*a*, 530*d* and two diagonally opposed raised corners 530*b*, 530*c*.

The peripheral edges 520*a*, 520*b* include two sets of cutting edges. As seen in FIG. 1, each set includes a raised corner cutting edge 540*b* associated with a first corner side surface 516*b*, a major cutting edge 542*b* adjacent to the raised corner cutting edge 540*b* and extending along a first major side surface 512*b*, and a raised corner wiper edge 544*b* adjacent to the raised corner cutting edge 540*b*. The raised corner wiper edge 544*b* extends along a first minor side surface 514*b* which shares the first corner side surface 516*b* with the first major side surface 512*b*.

Milling cutters having such prior art cutting inserts 500 retained therein, cut in either a perpendicular direction or a horizontal direction with center cutting. When trying to ramp cut using a milling cutter with such prior art cutting inserts, a dull edge of the cutting insert 500 scrapes against the workpiece because the cutting insert 500 has no clearance. Thus, the workpiece to be cut is deformed and potentially hardened, and the life of the cutting insert 500 is reduced.

SUMMARY OF THE INVENTION

In one aspect, the present invention is directed to a cutting insert having two identical opposing end surfaces (102*a*, 102*b*), each end surface being provided with an abutment surface (104); a peripheral side surface (110) extending between the two opposing end surfaces (102*a*, 102*b*), the peripheral side surface comprising two opposing major side surfaces (112*a*, 112*b*), two opposing minor side surfaces (114*a*, 114*b*) and corner side surfaces (116*a*, 116*b*, 116*c*, 116*d*) located between adjacent major and minor side surfaces; a peripheral edge (120*a*, 120*b*) formed at the intersection of each end surface (102*a*, 102*b*) and the peripheral side surface (110); each end surface (102*a*, 102*b*) having four corners (130*a*, 130*b*, 130*c*, 130*d*) including two diagonally opposed lowered corners (130*a*, 130*d*) and two diagonally opposed raised corners (130*b*, 130*c*), the lowered corners (130*a*, 130*d*) being closer than the raised corners (130*b*, 130*c*) to a median plane (M) of the cutting insert which median plane (M) passes through the major and minor side surfaces (112*a*, 112*b*, 114*a*, 114*b*) and is mid-way between the end surfaces (102*a*, 102*b*).

In the cutting insert, at least one peripheral edge (120*a*) comprises two sets of cutting edges. Each set of cutting edges includes: a raised corner cutting edge (140*b*) associated with a first corner side surface (116*b*); a major cutting edge (142*b*) adjacent to the raised corner cutting edge (140*b*) and extending along a first major side surface (112*b*); a raised corner wiper edge (144*b*) adjacent to the raised corner cutting edge (140*b*) and extending along a first minor side surface (114*b*) which shares the first corner side surface (116*b*) with the first major side surface (112*b*); a lowered corner cutting edge (140*a*) associated with a second corner side surface (116*a*), the second corner side surface (116*a*) and the first corner side surface (116*b*) sharing the first minor side surface (114*b*); and a lowered corner wiper edge (146*a*) adjacent to the lowered corner cutting edge (140*a*) and extending along the first minor side surface (114*b*) towards the raised corner wiper edge (144*b*).

In addition, in the cutting insert, each corner side surface (116*a*, 116*b*, 116*c*, 116*d*) is provided with concave clearance depression (150) which extends from the lowered corner cutting edge (140*a*), past the median plane (M), and in a direction of, but not intersecting, a raised corner cutting edge (130*c*) associated with the opposite peripheral edge (120*b*), the concave clearance depression (150) forming a relief surface (152) for the lowered corner cutting edge (140*a*) and being visible in both a major side view and a minor side view of the cutting insert.

In another aspect the present invention is directed to a method of milling a workpiece which uses milling cutter having a plurality of such cutting inserts seated therein, and moving the milling cutter simultaneously in both an axial and a transverse direction relative to the workpiece.

In still another aspect, the present invention is directed to a milling cutter comprising a milling cutter body having a plurality of such cutting inserts seated therein.

BRIEF DESCRIPTION OF THE DRAWINGS

For a better understanding of the present invention and to show how the same may be carried out in practice, reference will now be made to the accompanying drawings, in which.

DETAILED DESCRIPTION

Figure 1:
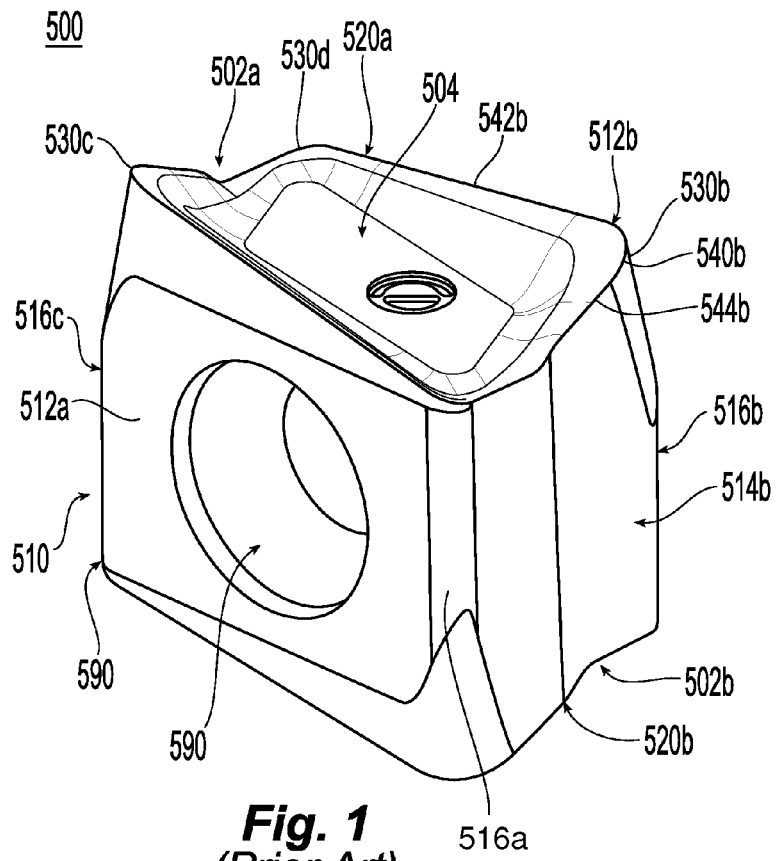
FIG. 1 shows a perspective view of a prior art tangential cutting insert.
Figure 2:
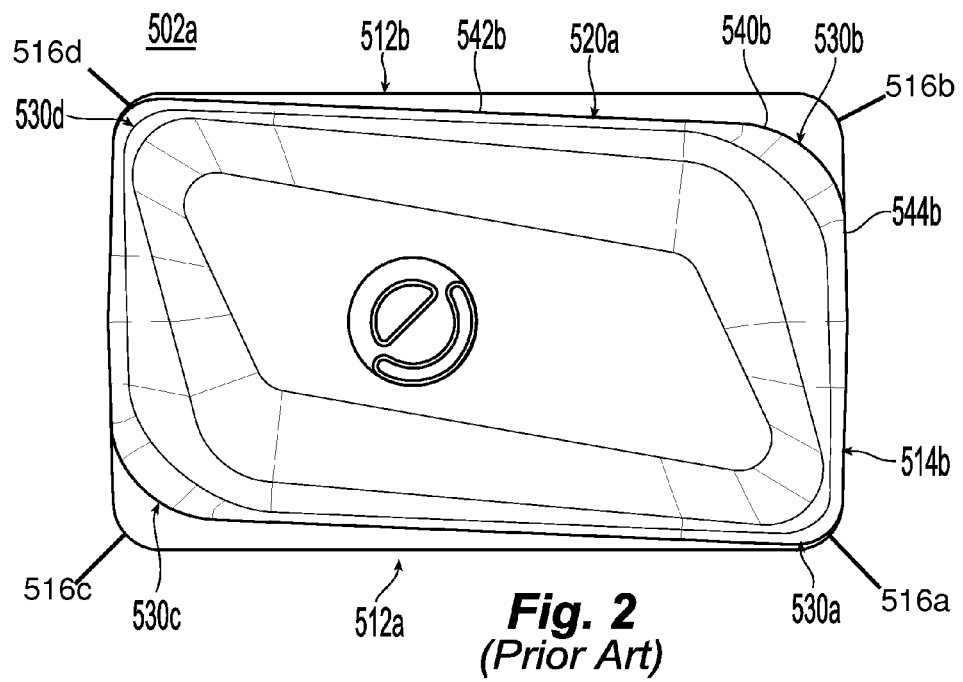
FIG. 2 shows an end view of a prior art cutting insert.
Figure 3:
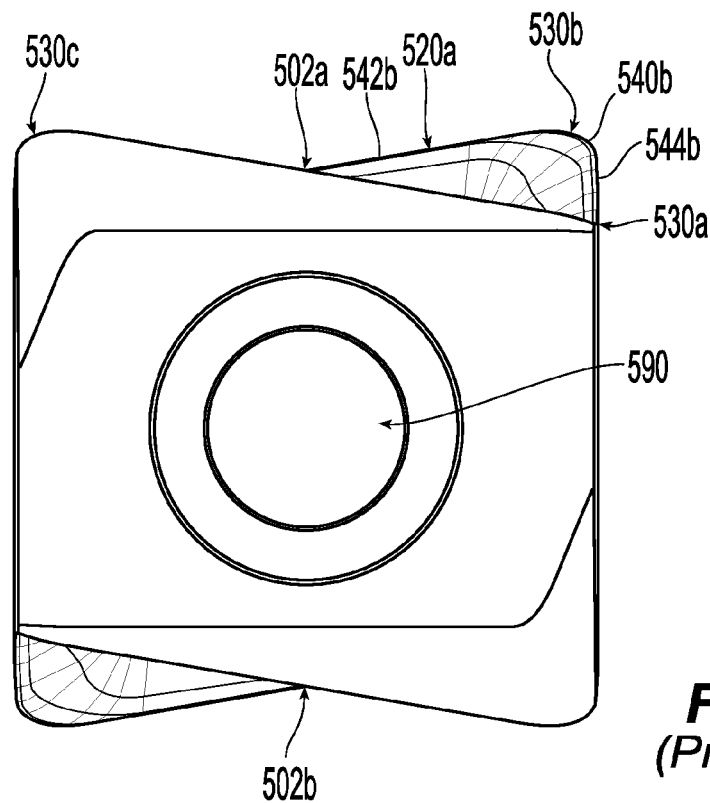
FIG. 3 shows a major side view of a prior art cutting insert.
Figure 4:
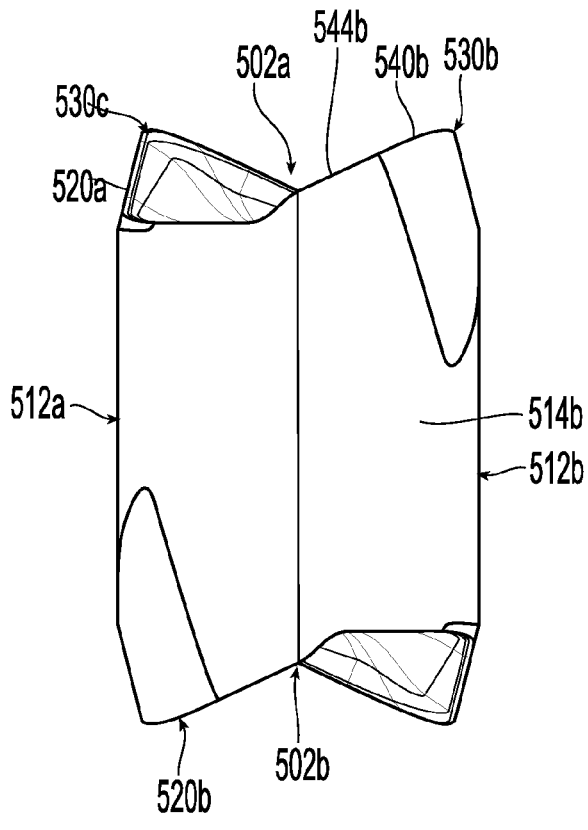
FIG. 4 shows a minor side view of a prior art cutting insert.
Figure 5:
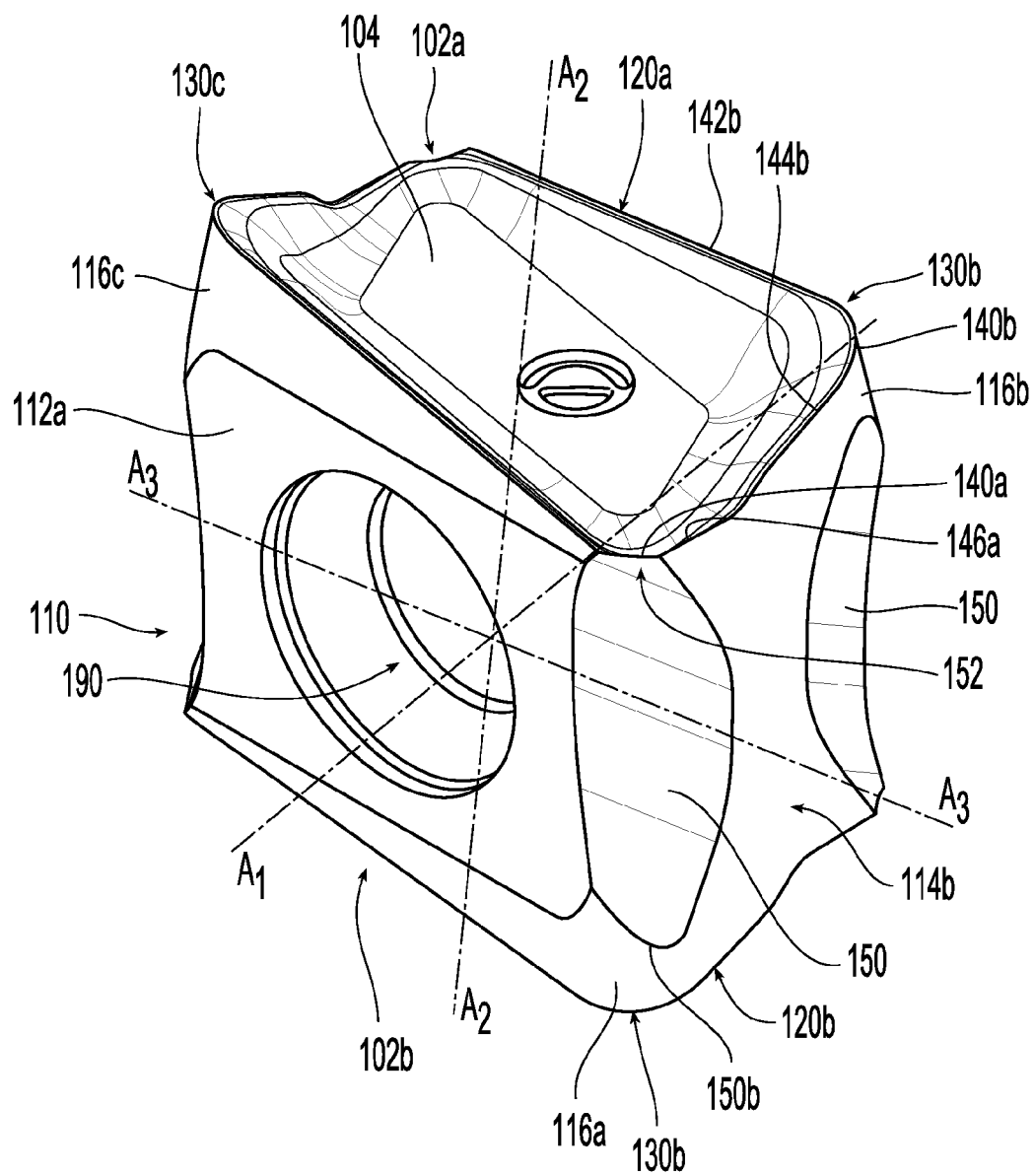
FIG. 5 shows a perspective view of a tangential cutting insert in accordance with one embodiment of the present invention.

FIGS. 5 through 8 show a tangential cutting insert 100 for use in a milling cutter in accordance with the present invention. FIG. 5 best shows the main surfaces of the cutting insert 100. The cutting insert 100 has two identical end surfaces 102a, 102b. Each end surface 102a, 102b is provided with an abutment surface 104. A peripheral side surface 110 extends between the two opposing end surfaces 102a, 102b. The peripheral side surface 110 is comprised of two opposing major side surfaces 112a, 112b, two opposing minor side surfaces 114a, 114b, and corner side surfaces 116a, 116b, 116c, 116d that are located between adjacent major side surfaces 112a, 112b and minor side surfaces 114a, 114b. A peripheral edge 120a, 120b is formed at the intersection of each end surface 102a, 102b and the peripheral side surface 110. The cutting insert 100 also includes a through bore 190 that passes between the opposing major side surfaces 112a, 112b.

Figure 7:
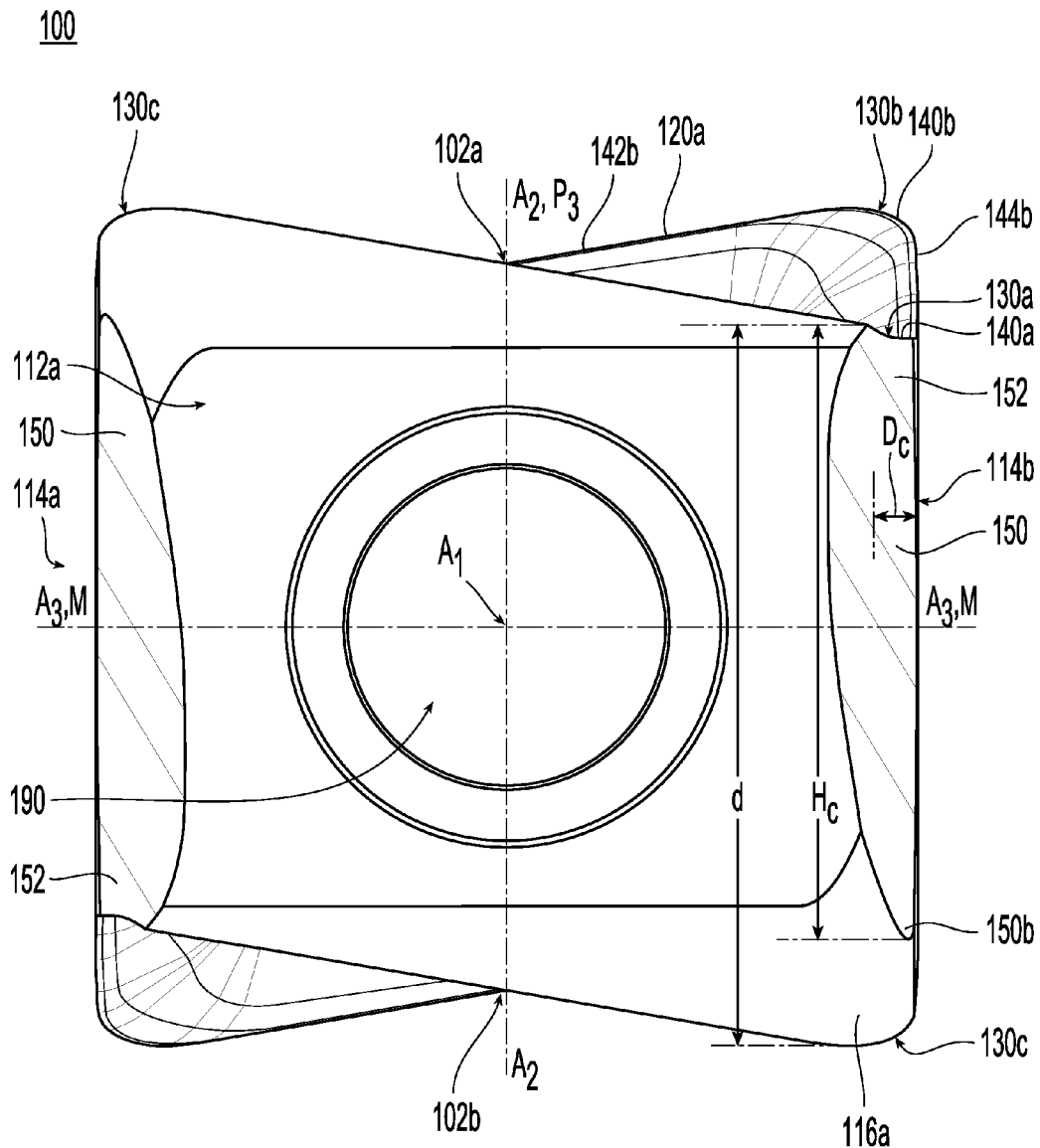
FIG. 7 shows a major side view of the cutting insert of FIG. 5.

As seen in FIG. 7, a median plane M of the cutting insert 100 passes through the major and minor side surfaces 112a, 112b, 114a, 114b and is mid-way between the end surfaces 102a, 102b. As best seen in FIGS. 5 and 7, a first axis A1 passes though the opposing major side surfaces 112a, 112b. A second axis A2 is perpendicular to the first axis A1 and passes through both end surfaces 102a, 102b. A third axis A3 is perpendicular to both the first axis A1 and the second axis A2 and passes through the opposing minor side surfaces 114a, 114b. In one embodiment, the cutting insert 100 has 180° rotational symmetry about all three axes A1, A2, and A3. In another embodiment, the cutting insert 100 has 180° rotational symmetry about only one or two of the axes A1, A2, and A3.

Figure 6:
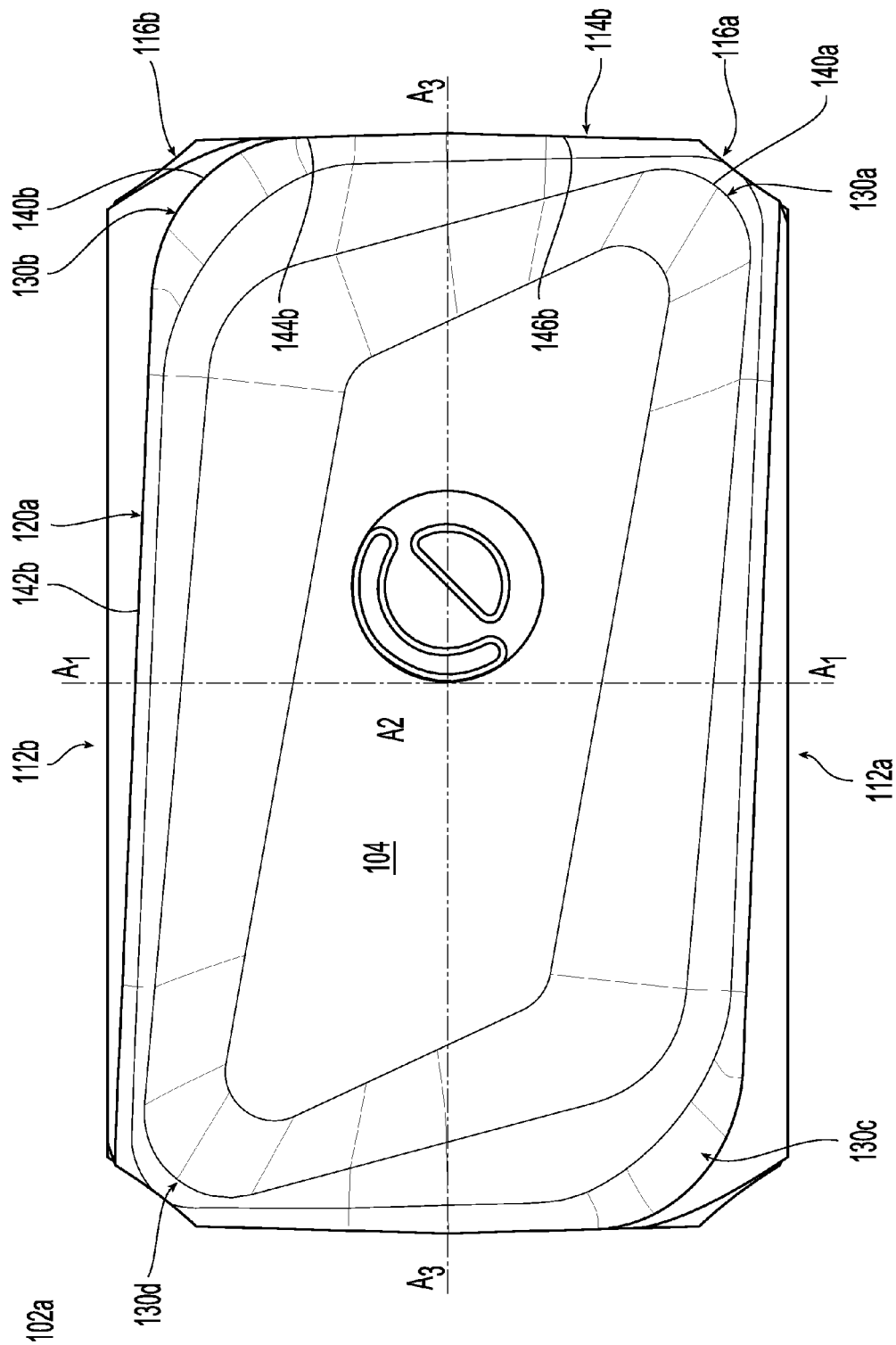
FIG. 6 shows an end view of the cutting insert of FIG. 5.

As best seen in FIG. 6, each end surface 102a, 102b has four corners 130a, 130b, 130c, 130d including two diagonally opposed lowered corners 130a, 130d and two diagonally opposed raised corners 130b, 130c. The diagonally opposed lowered corners 130a, 130d are closer to the median plane M of the cutting insert than the diagonally opposed raised corners 130b, 130c.

Figure 9:
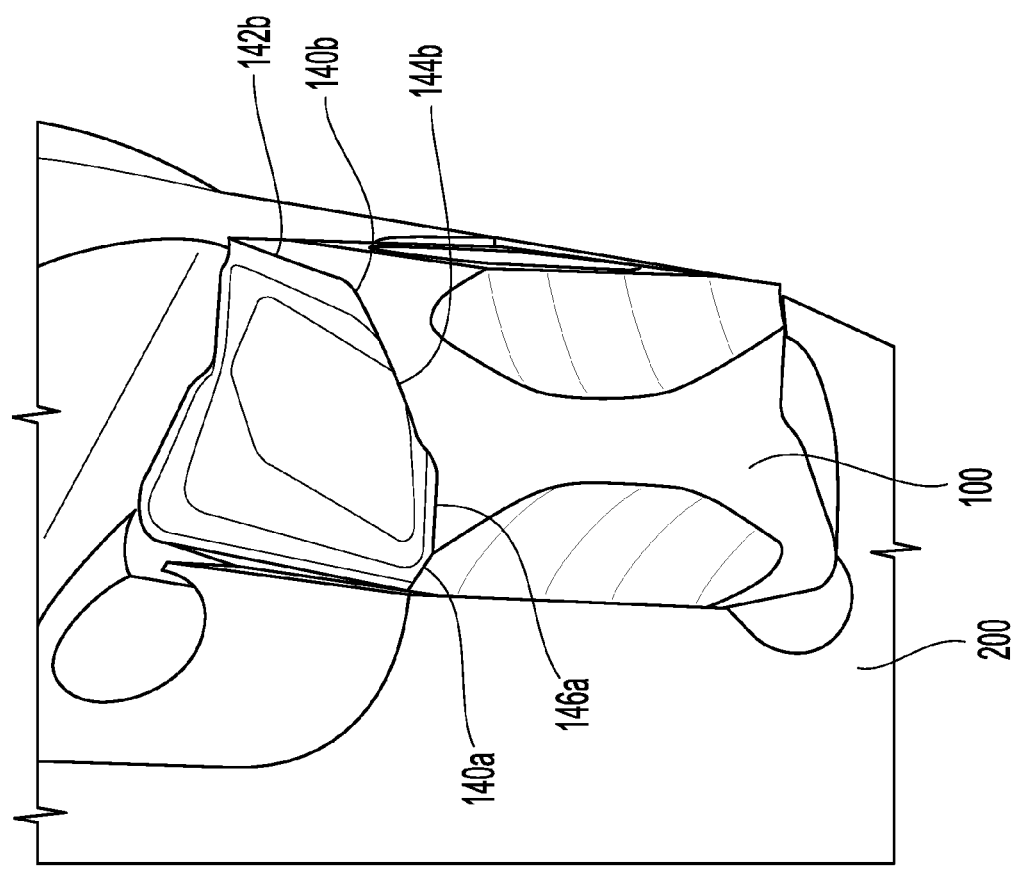
FIG. 9 shows a top view of a 2.000 inch diameter milling cutter with the cutting insert of FIG. 5 retained therein.

The peripheral edges 120a, 120b include at least one set of cutting edges. FIG. 9 illustrates one embodiment of a set of cutting edges on a peripheral edge 120a of the cutting insert 100 in a milling cutter 200 of the present invention. Preferably, the peripheral edges 120a, 120b include two sets of cutting edges. Each set of cutting edges includes a primary subset of "outer" cutting edges and a secondary subset of "inner" cutting edges. During ramping operations, the primary subset of cutting edges forms an outer diameter cut of a workpiece 400. The secondary subset forms an inner diameter cut of the workpiece 400.

As seen in FIGS. 5 and 9, the primary subset of cutting edges includes a raised corner cutting edge 140b associated with a first corner side surface 116b, a major cutting edge 142b adjacent to the raised corner cutting edge 140b and extending along a first major side surface 112b, and a raised corner wiper edge 144b adjacent to the raised corner cutting edge 140b. The raised corner wiper edge 144b extends along a first minor side surface 114b which shares the first corner side surface 116b with the first major side surface 112b. The secondary subset of cutting edges includes a lowered corner cutting edge 140a associated with a second corner side surface 116a and a lowered corner wiper edge 146a adjacent to the lowered corner cutting edge 140a. The second corner side surface 116a and the first corner side surface 116b are both adjacent to the first minor side surface 114b. The lowered corner wiper edge 146a extends along the first minor side surface 114b towards the raised corner wiper edge 144b.

Figure 8:
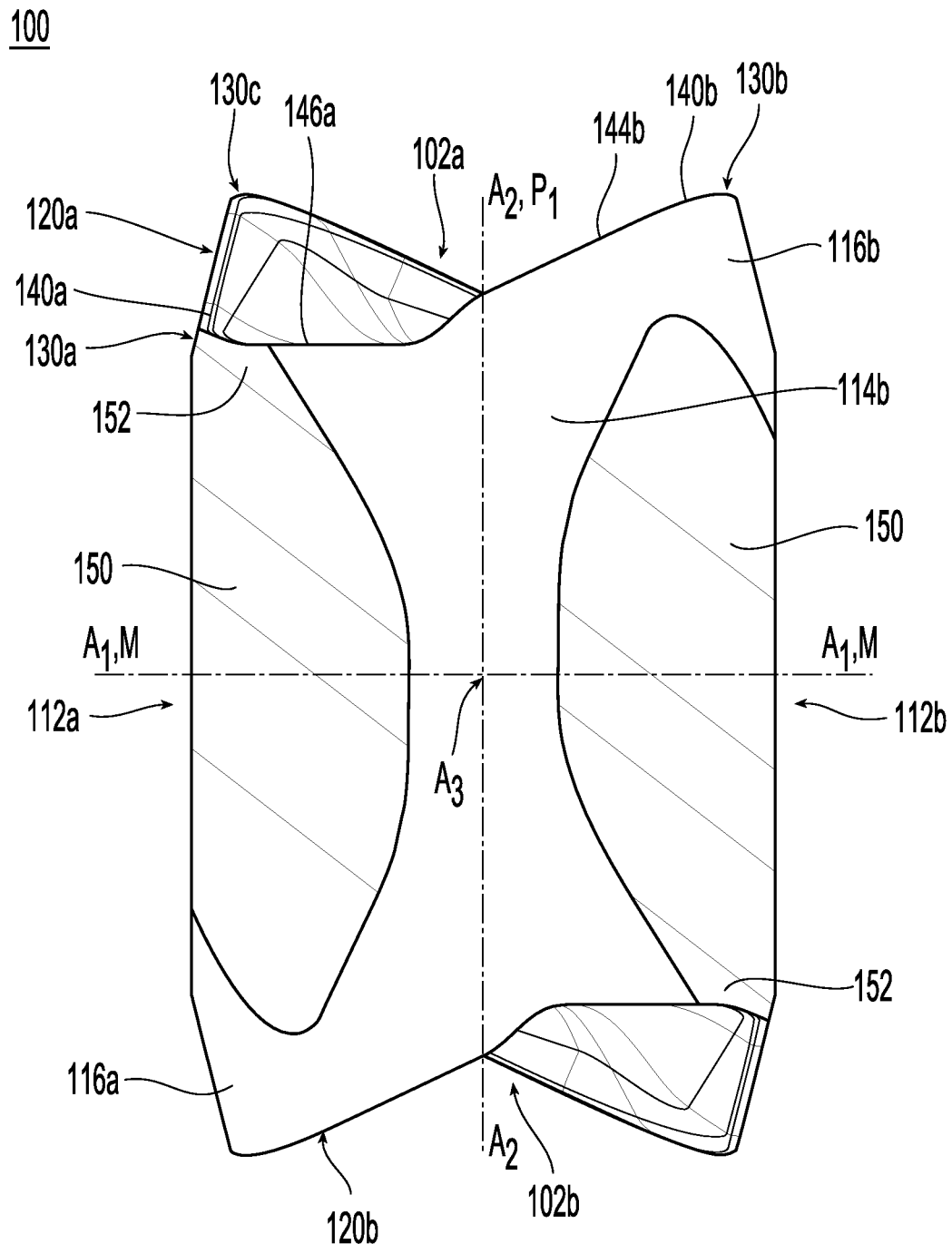
FIG. 8 shows a minor side view of the cutting insert of FIG. 5.

As shown in FIGS. 5, 7 and 8, each corner side surface 116a, 116b, 116c, 116d of the cutting insert 100 is provided with a concave clearance depression 150. In one embodiment, the concave clearance depression 150 is formed by a form cut while manufacturing the cutting insert 100. It is understood, however, that multi-axis dies may be used to press a green body having concave clearance depressions, after which the green body is sintered.

The concave clearance depression 150 extends from the lowered corner cutting edge 140a, past the median plane M and in a direction of, but not intersecting, a corresponding raised corner 130c associated with the opposite end surface 102b. The concave clearance depression 150 forms a relief surface 152 for the lowered corner cutting edge 140a and is visible in both a major side view and a minor side view of the cutting insert 100. As seen in at least FIGS. 5 and 7, one end of the concave clearance depression 150 meets the lowered corner cutting edge 140. However, the opposite end 150b of the concave clearance depression 150 does not meet the opposite raised corner 130c.

Each of the concave clearance depressions 150 is asymmetric about the median plane M. Also, the third axis A3 does not intersect any of the concave depressions 150 formed in the corner side surfaces 116a, 116b, 116c, 116d.

The height $H_c$ (as shown in FIG. 7) of the concave clearance depression 150 is taken along a direction between the lowered corner cutting edge 140a and the raised corner 130c associated with the opposite end surface 102b. In one embodiment, the height $H_c$ of the concave clearance depression 150 is at least 50-95% of a distance d between the lowered corner cutting edge 140a and the raised corner 130c associated with the opposite end surface 102b. In one embodiment, the greatest depth $D_c$ (as shown in FIG. 7) of the concave clearance depression 150, taken from an imaginary tangent line of an imaginary "uncut" corner side surface, can range from 6-12% of the height $H_c$ of the concave clearance depression 150.

In one embodiment, the cutting insert 100 of the present invention can be retained in more than one type of milling cutter 200. The milling cutter 200 does not have to be specially designed to ramp cut a workpiece 100. Rather, the milling cutter 200 can be a standard cutter in which the cutting insert 100 can be retained to ramp cut a workpiece 400. However, in other embodiments, the milling cutter 200 can instead be a specialized cutter used to ramp cut a workpiece 400. In some embodiments, the cutting insert 100 is indexable in the milling cutter 200 and in some embodiments is formed to be 4-way indexable in a milling cutter 200.

Figure 10:
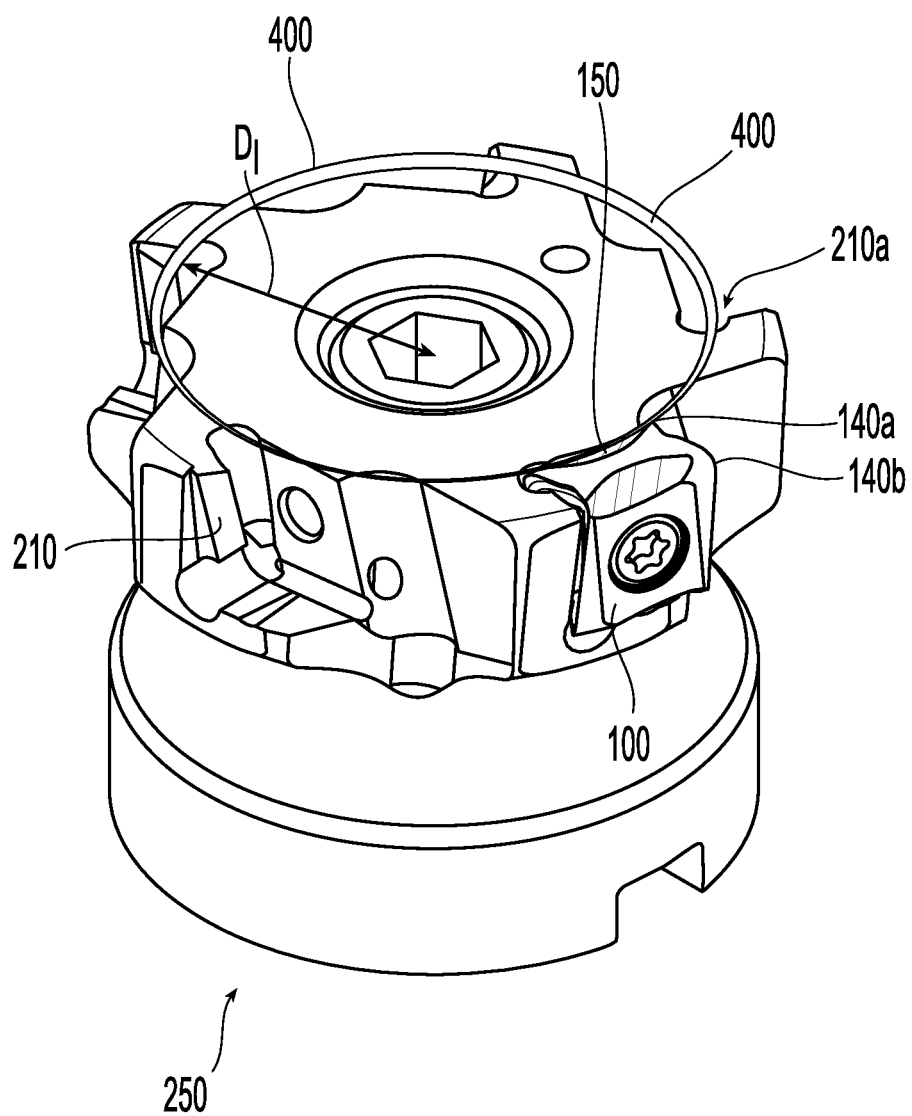
FIG. 10 shows a top isometric view of a 2.000 inch diameter milling cutter with the cutting insert of FIG. 5 retained therein.
Figure 11:
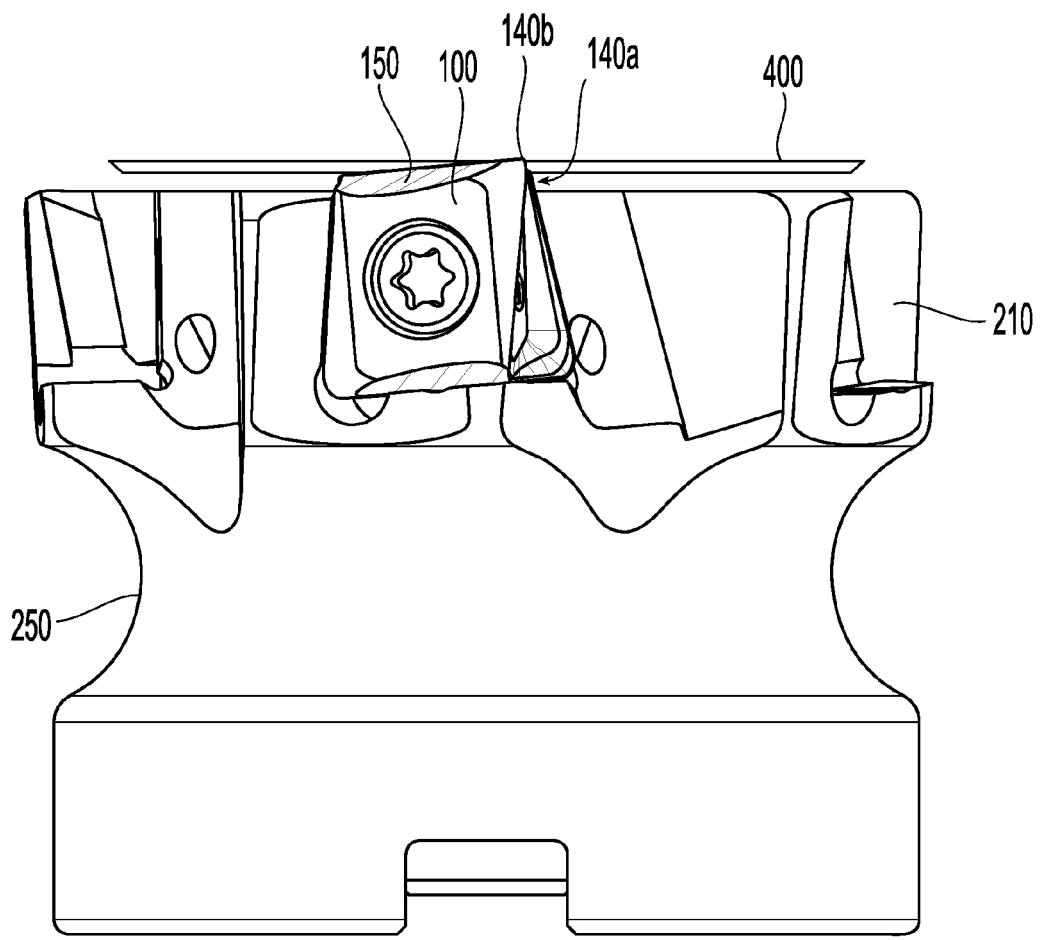
FIG. 11 shows a side view of the milling cutter of FIG. 10.
Figure 12:
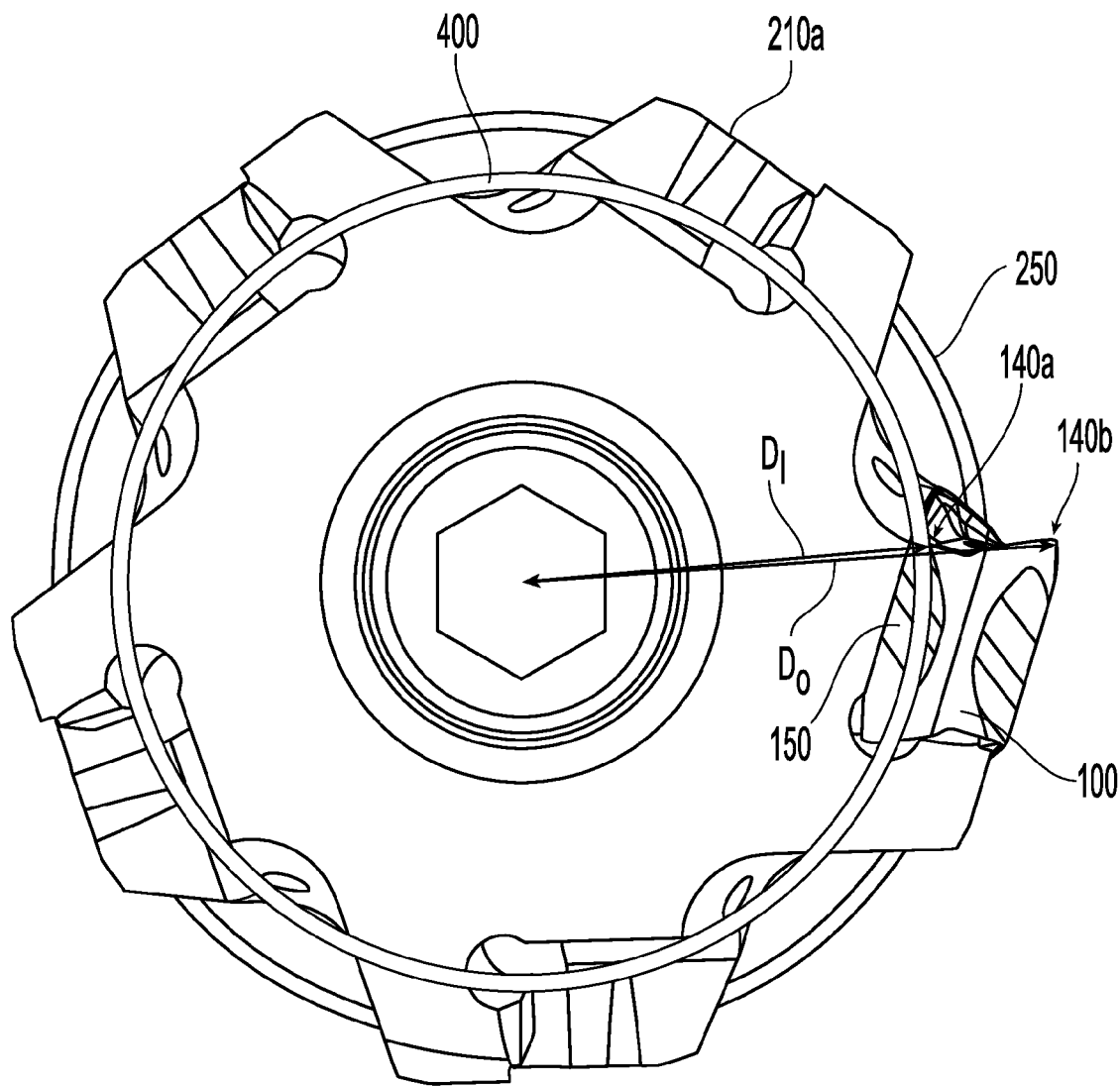
FIG. 12 shows a top view of the milling cutter of FIG. 10.

FIGS. 10-12 show an embodiment of a standard 2.000 inch outer diameter milling cutter 250 having a plurality of pockets 210, one of which is shown to have a cutting insert 100 tangentially seated and retained therein. It is understood that, during actual use, each of the five pockets 210 of such a milling cutter 250 would have a cutting insert 100 retained therein. As best seen in FIG. 11, during cutting operations, the operative raised corner cutting edge 140b sweeps out an outer diameter cut $D_O$ while the operative lowered corner cutting edge 140a sweeps out an inner diameter cut $D_I$. Meanwhile, the cutting insert's operative concave clearance depression 150 provides relief for the lowered corner cutting edge 140a of the cutting insert 100 and, during ramping operations, accommodates a portion of the workpiece 400 which is depicted in FIGS. 10-12 as ring-shaped path which enters the concave clearance depression 150.

Figure 13:
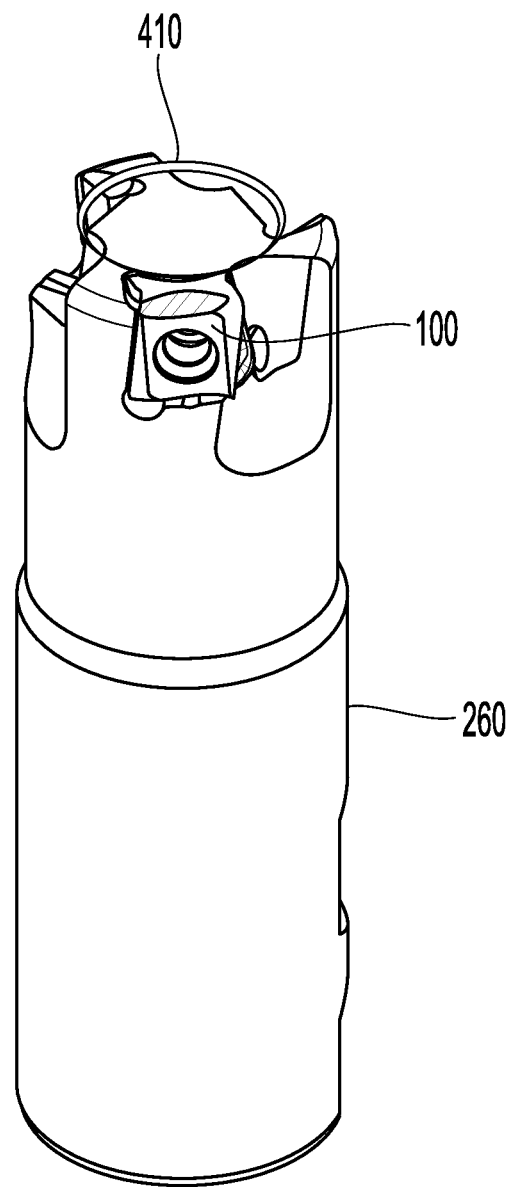
FIG. 13 shows a first isometric view of a 1.250 inch diameter milling cutter with the cutting insert of FIG. 5 retained therein.
Figure 14:
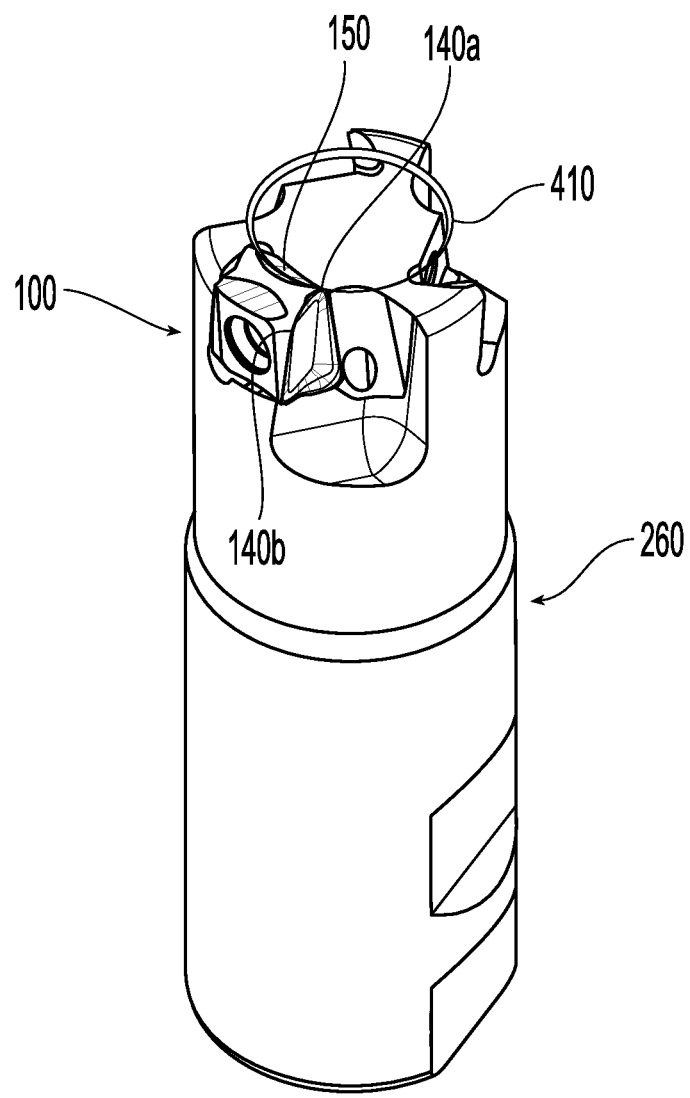
FIG. 14 shows a second isometric view of the milling cutter of FIG. 13.
Figure 15:
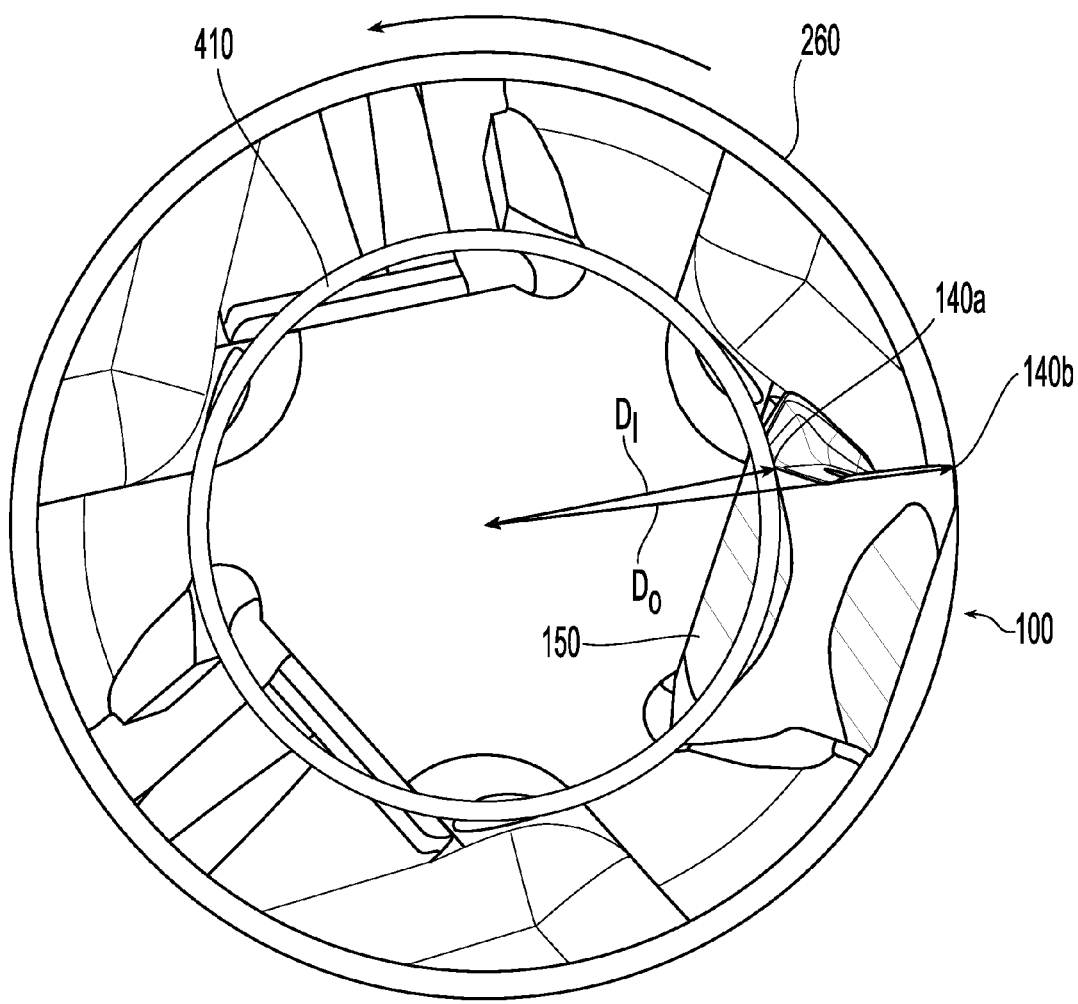
FIG. 15 shows a top view of the milling cutter of FIG. 13.

FIGS. 13-15 show an embodiment of a standard 1.250 inch outer diameter milling cutter 260 having a plurality of pockets 210, one of which is shown to have a cutting insert 100 tangentially seated and retained therein. Again, it is understood that, during actual use, each of the four pockets 210 of such a milling cutter 260 would have a cutting insert 100 retained therein. As best seen in FIG. 15, during cutting operations, the operative raised corner cutting edge 140b sweeps out an outer diameter cut $D_O$ while the operative lowered corner cutting edge 140a sweeps out an inner diameter cut $D_I$. Meanwhile, the cutting insert's operative concave clearance depression 150 provides relief for the lowered corner cutting edge 140a of the cutting insert 100 and, during ramping operations, accommodates a portion of the workpiece which is depicted in FIGS. 13-15 as a ring-shaped path which enters the concave clearance depression 150.

Figure 16:
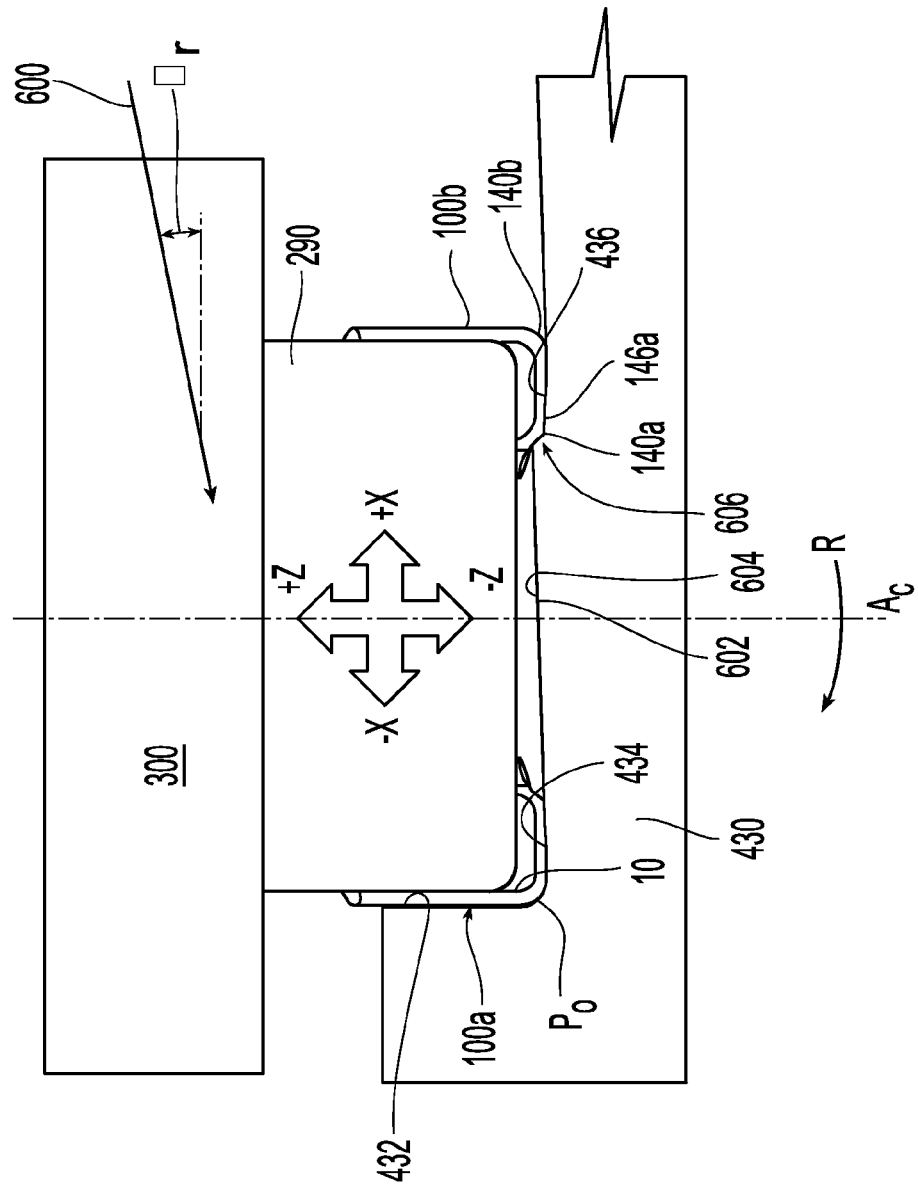
FIG. 16 shows a milling cutter mounted on a spindle and having two cutting inserts of FIG. 5 retained therein.

FIG. 16 depicts a cross-sectional view of a milling cutter 290 mounted on a spindle 300 and cutting a workpiece 430. As it cuts, the milling cutter 290 rotates in a rotational direction R about the cutter rotational axis $A_c$ which extends along an axial (or "Z") direction of the workpiece 430. In a ramping operation, the milling cutter 290 simultaneously moves both in the axial "Z" direction and also in a transverse (or "X") direction to form a ramp angle $\alpha_r$ (depicted in FIG. 16 with reference to ramp arrow 600), to thereby form a ramp 602 on the workpiece 400. The ramp 602 comprises a generally axially facing ramp surface 604 defined by a circumferential ramp peripheral edge 606. Thus, with each rotation, the milling cutter 290 moves deeper (axially) into the workpiece 400 and also in a transverse direction. As seen in FIG. 16, the ramp 602 is tallest at the trailing portion of the ramp peripheral edge 606. Also, it is understood that in an axial view along the "Z"-axis, the ramp surface 604 has a generally circular appearance.

First and second cutting inserts 100a, 100b are seen in the cross-section of FIG. 16, which may be a 1.25 inch diameter milling cutter having four circumferentially equally spaced insert pockets. It is therefore understood that additional cutting inserts (not shown) may also be mounted on the milling cutter 290. First cutting insert 100a, whose inoperative end surface 102b is visible in FIG. 16, has an operative primary subset of cutting edges (hidden from view in FIG. 16). In the cross-section shown, the operative primary subset of cutting edges (140b, 142b, 144b) of the first cutting insert 100a is cutting a leading, transversely facing arcuate portion 432 of the workpiece 430 and is also cutting a leading axially facing portion 434 of the workpiece 430. Meanwhile, second cutting insert 100b has an operative secondary subset of cutting edges (140a, 146a) which, in the cross-section shown, is shaving a trailing portion of the ramp peripheral edge 606 and also an axially facing trailing portion 436 of the workpiece 430.

In the cross-section seen in FIG. 16, the milling cutter 290 cuts new material of the workpiece 430 in the transverse "X" direction using the operative primary subset of cutting edges (i.e., the unseen raised corner cutting edge 140b, the major cutting edge 142b, and the raised corner wiper edge 144b) of first cutting insert 100a, with the operative raised corner cutting edge 140b making initial contact at a point Po in the shown cross-section.

The operative secondary subset of cutting edges (i.e., the unseen lowered corner cutting edge 140a and the lowered corner wiper edge 146a) of first cutting insert 100a generally are not cutting the workpiece 430 in the position shown. However, as soon as the first cutting insert 100a rotates past the position shown in FIG. 16, its operative secondary subset of cutting edges begin to cut a peripheral edge of the rising ramp 602 (the ramp rising in the +X direction in the shown cross-section) with the depth of cut increasing until the ramp 602 reaches a maximum height at the diametrically opposite position occupied by second cutting insert 100b in FIG. 16. Thereafter, the depth of cut of the operative secondary subset of cutting edges belonging to first cutting insert 100a decreases (since the ramp height decreases in the −X direction in the shown cross-section) until the first cutting insert 100a once again reaches the position in which it appears in FIG. 16. Thus, in one embodiment, except possibly at the instantaneous position occupied by first cutting insert 100a as seen in FIG. 16, the operative secondary subset of cutting edges belonging to all cutting inserts shave the ramp 602 throughout each 360° rotation of the milling cutter 290.

Because the workpiece 400 is not center cut but is instead ramp cut, the ramp 602 is higher than the position of the operative secondary subset of cutting edges belonging to the second cutting insert 100b, and is highest at the trailing portion of the ramp peripheral edge 606. During ramping operations, the concave clearance depression 150 receives a portion of the ramp peripheral edge 606, thereby providing a relief surface 152 for the operative lowered corner cutting edge 140a of the inserts, as the ramp peripheral edge 606 is shaved.

Generally speaking, the ramp angle $\alpha_r$ at which the milling cutter 290 cuts the workpiece 430 is determined by the maximum depth of cut of the lowered corner cutting edge 140a and the inner diameter $D_I$ of the cutting insert 100, as seated in the milling cutter 290. In general, the ramp angle $\alpha_r$ and the diameter $D_I$ have an inverse relationship, the larger the inner diameter $D_I$ of the milling cutter 290, the smaller the maximum ramp angle $\alpha_r$. Thus, in one set of embodiments, the maximum ramp angle $\alpha_r$ of a 1.250 inch diameter milling cutter 260 is 1.75 degrees, while the maximum ramp angle $\alpha_r$ of a 2.000 inch diameter milling cutter 250 is 0.75 degrees.

Figure 17A:
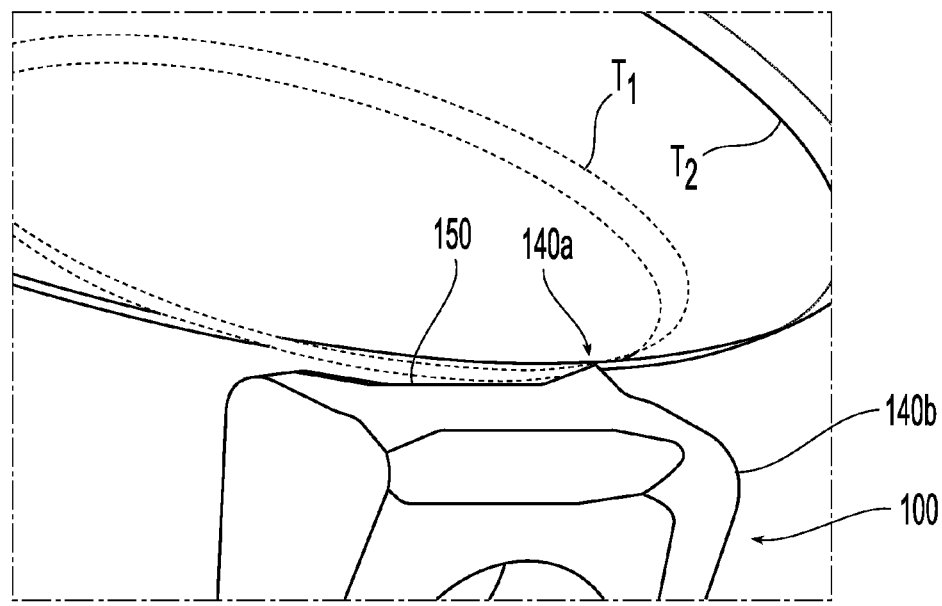
FIGS. 17a and 17b show different isometric views of two different tool arcs superimposed on a concave clearance depression of the cutting insert of FIG. 5.
Figure 17B:
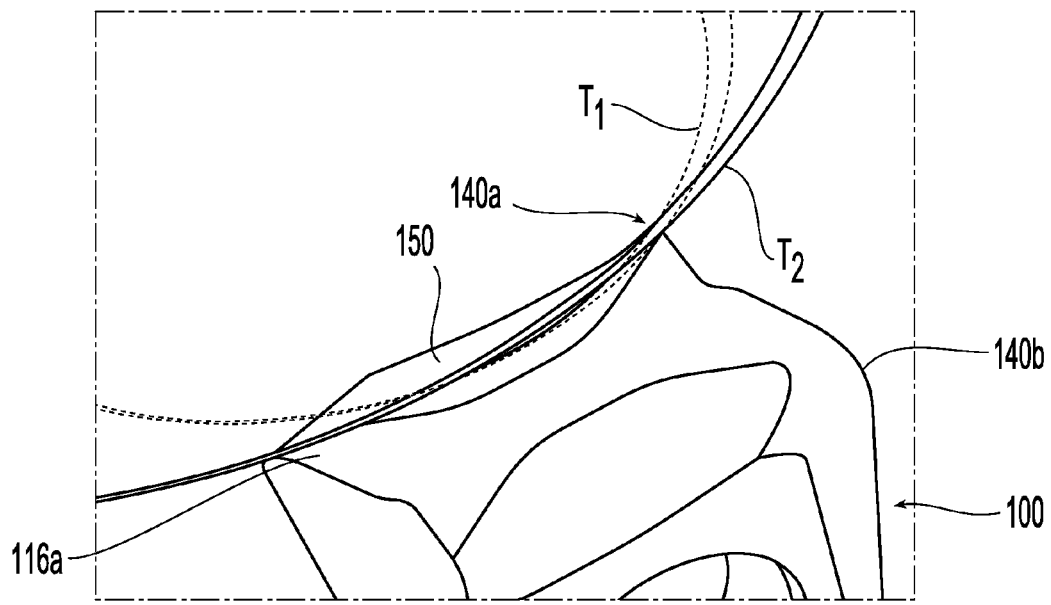

FIGS. 17a & 17b show the cutting insert 100 in relation to the tool arc $T_1$ created by the 1.250 inch milling cutter 260 and the tool arc $T_2$ created by the 2.000 inch milling cutter 250. The tool arcs $T_1$ and $T_2$ represent the inner diameter $D_I$ of their respective milling cutters 260 and 250. FIG. 17b provides a slightly different isometric view of the tool arcs $T_1$ and $T_2$. To create the concave clearance depression 150 in the cutting insert 100, the form cut of the cutting insert 100 during manufacture must take into account the tool arcs of the milling cutters in which the cutting insert is to be seated. In some embodiments, the concave clearance depression 150 is not a cylindrical surface. In one embodiment, to minimize the amount of material removed to create the concave clearance depression 150, the form cut's shape is not a single radius through cut.

As seen in FIGS. 17a & 17b, the tool arc $T_1$ of the 1.250 inch diameter milling cutter 260 extends deeper into the cutting insert 100 than the tool arc $T_2$ of the 2.000 inch diameter milling cutter 250. However, the tool arc $T_2$ created by the 2.000 inch diameter milling cutter 250 extends within the concave clearance depression 150 along a greater length of the corresponding corner side surface 116a than the tool arc $T_1$ created the by 1.250 inch diameter milling cutter 260.

However, the cutting insert 100 can be provided with a concave clearance depression 150 of sufficient height and depth to accommodate both tool arcs, and thus be used in milling cutters of both sizes for ramping operations. Even so, it is understood that one may form a cutting insert with concave clearance depressions 150 having only sufficient height and depth for use in just one milling cutter. It is additionally understood that the concave clearance depression 150 cutting insert may be formed to accommodate milling cutters of other sizes as well.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (100) for use in a milling cutter comprising:
   two identical opposing end surfaces (102a, 102b), each end surface being provided with an abutment surface (104);
   a peripheral side surface (110) extending between the two opposing end surfaces (102a, 102b), the peripheral side surface comprising two opposing major side surfaces (112a, 112b), two opposing minor side surfaces (114a, 114b) and corner side surfaces (116a, 116b, 116c, 116d) located between adjacent major and minor side surfaces;
   a peripheral edge (120a, 120b) formed at the intersection of each end surface (102a, 102b) and the peripheral side surface (110);
   each end surface (102a, 102b) having four corners (130a, 130b, 130c, 130d) including two diagonally opposed lowered corners (130a, 130d) and two diagonally opposed raised corners (130b, 130c)), the lowered corners (130a, 130d) being closer than the raised corners (130b, 130c) to a median plane (M) of the cutting insert which median plane (M) passes through the major and minor side surfaces (112a, 112b, 114a, 114b) and is mid-way between the end surfaces (102a, 102b);
   wherein:
   at least one peripheral edge (120a) comprises two sets of cutting edges, each set of cutting edges comprising:
      a raised corner cutting edge (140b) associated with a first corner side surface (116b);
      a major cutting edge (142b) adjacent to the raised corner cutting edge (140b) and extending along a first major side surface (112b);
      a raised corner wiper edge (144b) adjacent to the raised corner cutting edge (140b) and extending along a first minor side surface (114b) which shares the first corner side surface (116b) with the first major side surface (112b);
      a lowered corner cutting edge (140a) associated with a second corner side surface (116a), the second corner side surface (116a) and the first corner side surface (116b) sharing the first minor side surface (114b); and
      a lowered corner wiper edge (146a) adjacent to the lowered corner cutting edge (140a) and extending along the first minor side surface (114b) towards the raised corner wiper edge (144b); and
   each corner side surface (116a, 116b, 116c, 116d) is provided with concave clearance depression (150) which extends from the lowered corner cutting edge (140a), past the median plane (M), and in a direction of, but not intersecting, a raised corner cutting edge (130c) associated with the opposite peripheral edge (120b), the concave clearance depression (150) forming a relief surface (152) for the lowered corner cutting edge (140a) and being visible in both a major side view and a minor side view of the cutting insert.

2. The cutting insert (100) according to claim 1, wherein:
the cutting insert comprises a through bore (190) passing between the opposing major side surfaces (112a, 112b).

3. The cutting insert (100) according to claim 1, wherein:
the cutting insert has 180° rotational symmetry about a first axis (A1) which passes though the opposing major side surfaces (112a, 112b).

4. The cutting insert (100) according to claim 3, wherein:
the cutting insert has 180° rotational symmetry about a second axis (A2) which is perpendicular to the first axis (A1) and passes through both end surfaces (102a, 102b).

5. The cutting insert (100) according to claim 4, wherein:
the cutting insert has 180° rotational symmetry about a third axis (A3) which is perpendicular to both the first axis (A1) and to the second axis (A2), and passes through the opposing minor side surfaces (114a, 114b).

6. The cutting insert (100) according to claim 1, wherein:
the cutting insert has 180° rotational symmetry about a third axis (A3) which passes through the opposing minor side surfaces (114a, 114b).

7. The cutting insert (100) according to claim 6, wherein:
the third axis (A3) does not intersect any of the concave depressions (150) formed in the corner side surfaces (116a, 116b, 116c, 116d).

8. The cutting insert (100) according to claim 1, wherein:
a height $H_c$ of the concave clearance depression (150), taken along a direction between the lowered corner cutting edge (140a) and the raised corner (130c) associated with an opposite end surface (102b), is at least 50-90% of a distance d between the lowered corner cutting edge (140a) and the raised corner (130c) associated with the opposite peripheral edge (102b).

9. The cutting insert (100) according to claim 1, wherein:
each of the concave depressions (150) is asymmetric about the median plane (M).

10. A method of milling a workpiece, comprising:
providing a milling cutter (200) having a plurality of cutting insert pockets (210), each having a cutting insert (100) retained therein, each cutting insert (100) having:
   two identical opposing end surfaces (102a, 102b);
   a peripheral side surface (110) extending between the two opposing end surfaces (102a, 102b), the peripheral side surface comprising two opposing major side surfaces (112a, 112b), two opposing minor side surfaces (114a, 114b) and corner side surfaces (116a, 116b, 116c, 116d) located between adjacent major and minor side surfaces;
   a peripheral edge (120a, 120b) formed at the intersection of each end surface (102a, 102b) and the peripheral side surface (110);
   each end surface (102a, 102b) having four corners (130a, 130b, 130c, 130d) including two diagonally opposed lowered corners (130a, 130d) and two diagonally opposed raised corners (130b, 130c), the lowered corners (130a, 130d) being closer than the raised corners (130b, 130c) to a median plane (M) of the cutting insert which median plane (M) passes through the major and minor side surfaces (112a, 112b, 114a, 114b) and is mid-way between the end surfaces (102a, 102b);

wherein:
at least one peripheral edge (120*a*) comprises two sets of cutting edges, each set of cutting edges comprising:
a raised corner cutting edge (140*b*) associated with a first corner side surface (116*b*);
a major cutting edge (142*b*) adjacent to the raised corner cutting edge (140*b*) and extending along a first major side surface (112*b*);
a raised corner wiper edge (144*b*) adjacent to the raised corner cutting edge (140*b*) and extending along a first minor side surface (114*b*) which shares the first corner side surface (116*b*) with the first major side surface (112*b*);
a lowered corner cutting edge (140*a*) associated with a second corner side surface (116*a*), the second corner side surface (116*a*) and the first corner side surface (116*b*) sharing the first minor side surface (114*b*); and
a lowered corner wiper edge (146*a*) adjacent to the lowered corner cutting edge (140*a*) and extending along the first minor side surface (114*b*) towards the raised corner wiper edge (144*b*); and
each corner side surface (116*a*, 116*b*, 116*c*, 116*d*) is provided with concave clearance depression (150) which extends from the lowered corner cutting edge (140*a*), past the median plane and in a direction of, but not intersecting, a raised corner (130*c*) associated with the opposite end surface (102*b*); and
moving the milling cutter simultaneously in both an axial direction and a transverse direction, relative to the workpiece, to thereby form a ramp on an axially facing surface of the workpiece, the ramp having a peripheral edge;
such that at least a portion of a ramp peripheral edge of the ramp is accommodated within the concave clearance depression, as the lowered corner cutting edge shaves said ramp peripheral edge during rotation of the milling cutter.

11. A milling cutter (200) comprising:
a milling cutter body (220) comprising:
a plurality of insert pockets (210);
a plurality of cutting inserts (100), each cutting insert retained in one of the plurality of insert pockets (210),
wherein each cutting insert is in accordance with the cutting insert of claim 1.

12. The milling cutter (200) according to claim 11, wherein:
each cutting insert (100) is tangentially seated and retained in its insert pocket (210).

13. A method of milling a workpiece, comprising:
providing a milling cutter (200) in accordance with claim 11; and
moving the milling cutter simultaneously in both an axial direction and a transverse direction, relative to the workpiece, to thereby form a ramp on an axially facing surface of the workpiece, the ramp having a peripheral edge, such that at least a portion of a ramp peripheral edge of the ramp is accommodated within the concave clearance depression, as the lowered corner cutting edge shaves said ramp peripheral edge during rotation of the milling cutter.

* * * * *